(12) United States Patent
Yoshida et al.

(10) Patent No.: US 6,256,354 B1
(45) Date of Patent: Jul. 3, 2001

(54) VOICE RECORDING AND PLAYBACK MODE USING THE G.726 HALF-RATE WITHIN THE PERSONAL HANDY PHONE SYSTEM

(75) Inventors: Satoshi Yoshida, Nice; Patrick Feyfant, Roulon; Philippe Gaglione, Mandelieu; Denis Archambaud, Antibes; Varenka Martin, Antibes; Laurent Winckel, Antibes; Rita Lagomarsino, Antibes; Oliver Weigelt, Antibes, all of (FR)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/026,854

(22) Filed: Feb. 20, 1998

(51) Int. Cl.⁷ .................................................. H04B 14/06
(52) U.S. Cl. .......................... 375/244; 375/219; 455/411; 455/412; 455/413
(58) Field of Search .................................... 375/244, 219; 455/411, 412, 413

(56) References Cited

U.S. PATENT DOCUMENTS

| | | | | |
|---|---|---|---|---|
| 5,455,579 | * | 10/1995 | Bennett et al. | 341/110 |
| 5,583,915 | * | 12/1996 | Ishida | 379/58 |
| 5,790,957 | * | 8/1998 | Heidari | 455/553 |
| 5,842,123 | * | 11/1998 | Hamamoto et al. | 455/412 |
| 6,021,325 | * | 2/2000 | Hall | 455/412 |

OTHER PUBLICATIONS

"Personal Handy Phone System ARIB Standard", Version 2, Dec. 26, 1995 Association of Radio Industries and Businesses (ARIB).

Takeshita et al., "Personal Handy–Phone System (PHS) Guidebook" Ministries of Posts and Telecommunications, Japan.

* cited by examiner

Primary Examiner—Stephen Chin
Assistant Examiner—Mohammad Ghayour
(74) Attorney, Agent, or Firm—Wagner, Murabito & Hao LLP

(57) ABSTRACT

Voice recording and playback mode using the G.726 half-rate within the personal handy phone system (PHS). When a portable station within the PHS operates as a voice recorder (e.g., functioning as an answering machine), a cost effective system in accordance with the present invention is adapted to compress and store received voice/sound signals in order to increase the usage of limited memory resources provided within the portable station. The present invention also enables previously compressed and stored voice/sound signals to be decompressed and played back in various portable station playback modes. Specifically, the portable station receives a voice/sound signal in a full rate (e.g., 32 kilobits-per-second) 4-bit adaptive differential pulse code modulation (ADPCM) data format in compliance with the International Telecommunication Union (ITU) recommendation G.726. The present invention compresses this received voice/sound signal to a half rate (16 kilobit-per-second) 2-bit ADPCM data format in compliance with the ITU recommendation G.726 in order to increase the usage of the limited memory resources provided within the portable station. During a playback mode of the portable station, the present invention decompresses the previously compressed and stored voice/sound signal to facilitate its playback.

18 Claims, 8 Drawing Sheets

VOICE RECORDING AND PLAYBACK MODE USING THE G.726 HALF-RATE WITHIN THE PERSONAL HANDY PHONE SYSTEM

TECHNICAL FIELD

The present invention relates to the field of wireless telecommunication. More specifically, the present invention relates to the field of communication devices within the personal handy phone system (PHS).

BACKGROUND ART

Within the field of wireless telecommunications systems, there exists a system referred to as the personal handy phone system, otherwise known as PHS. Within the personal handy phone system, a user of a portable or personal station (PS) device is capable of communicating with a user of another telecommunication device by way of a cell station (CS) device. Furthermore, the portable station within the personal handy phone system can also function as an answering machine by recording incoming voice/sound messages and then playing them back later at some desired time. Moreover, the portable station can also be equipped with the capability to record both sides of a conversation when it is being used to communicate with another telecommunication device.

In order for a manufacturer of portable stations to keep competitively priced within a commercial market, it is important for the manufacturer to minimize its manufacturing costs of the portable stations. There are several different ways to decrease the cost of manufacturing portable stations, which include utilizing less expensive components to produce the same functionality. Another way to decrease manufacturing costs is to limit the amount of integrated circuit chips (e.g., memory chips) installed within the portable stations to some minimum requirement. By utilizing the above mentioned techniques along with others, the manufactured portable stations are competitively priced when sold to the general public.

Since the amount of memory space within a portable station is limited, it is important to maximize the usage of available memory resources as much as possible. In order to maximize the usage of available memory space, it is important to focus on portable station functions that utilize a large amount of memory space. For instance, one memory demanding function performed by the portable station is the recording of received voice and sound signals. There are several prior art methods within the personal handy phone system to maximize memory space usage while a portable station is recording voice/sound signals. One prior art method is to store the received voice/sound signals in memory using the compressed data format in which they are received by the portable station, e.g., a full rate (32 kilobits-per-second) 4-bit adaptive differential pulse code modulation (ADPCM) compressed data format. The problem associated with this prior art solution is that the voice/sound signals in the full rate 4-bit ADPCM compressed data format occupy too much of the memory space located within the portable station.

Another prior art method to maximize the limited memory space contained within a portable station when it is functioning as a voice recorder is to use a digital signal processor (DSP) integrated circuit chip within the portable station to further compress the received voice/sound signals before storing them within memory. The problem associated with this prior art solution is that digital signal processor integrated circuit chips are very expensive components, which dramatically increase the manufacturing cost of a portable station. As described above, phone manufacturers desire to reduce the expense of the portable stations to remain competitive in this market.

Therefore, it would be advantageous to provide a cost effective system enabling a portable station within the personal handy phone system to record voice and sound signals while increasing its usage of its available memory space and subsequently playing the recorded messages back. The present invention provides these advantages.

DISCLOSURE OF THE INVENTION

The present invention includes a cost effective system enabling a portable station within the personal handy phone system (PHS) to record and playback recorded voice and sound signals at half rate adaptive differential pulse code modulation data format. When a portable station within the PHS operates as a voice recorder (e.g., functioning as an answering machine), a cost effective system in accordance with the present invention is adapted to compress and store received voice/sound signals in order to increase the usage of limited memory resources provided within the portable station. The present invention also enables previously compressed and stored voice/sound signals to be decompressed and played back in various portable station playback modes. Specifically, the portable station receives a voice/sound signal in a full rate (e.g., 32 kilobits-per-second) 4-bit adaptive differential pulse code modulation (ADPCM) data format in compliance with the International Telecommunication Union (ITU) recommendation G.726. The present invention compresses this received voice/sound signal to a half rate (16 kilobit-per-second) 2-bit ADPCM data format in compliance with the ITU recommendation G.726 in order to increase the usage of the limited memory resources provided within the portable station. During a playback mode of the portable station, the present invention decompresses the previously compressed and stored voice/sound signal to facilitate its playback.

One embodiment of the present invention is a circuit comprising a first receiving channel circuit coupled to receive a first incoming voice signal received by the portable station from a wireless interface. Furthermore, the first receiving channel circuit is for decoding the first incoming voice signal from a first data format to a second data format. The circuit further comprises a first transmitting channel circuit communicatively coupled to the first receiving channel circuit to receive the first incoming voice signal in the second data format and for encoding the first incoming voice signal from the second data format to a third data format. The circuit also comprises a memory device coupled to the transmitting channel circuit to receive the first incoming voice signal in the third data format and for storing the first incoming voice signal in the third data format. The third data format is a compression of the first data format.

Another embodiment of the present invention includes the circuit described above and further comprises a second receiving channel circuit coupled to the memory device to receive a first stored voice signal in the third data format and for decoding the first stored voice signal from the third data format to the second data format. The circuit further comprises a second transmitting channel circuit coupled to the second receiving channel circuit to receive the first stored voice signal in the second data format and for encoding the first stored voice signal from the second data format to the first data format. The first stored voice signal in the first data format is for transmitting over the wireless interface by the portable station.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a cost effective system enabling a portable station within the personal handy phone system to record and playback recorded voice/sound signals at half rate adaptive differential pulse code modulation data format, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention operates within the communication system known as the personal handy phone system which provides its users wireless voice communication. Along with providing its users wireless voice communication, the personal handy phone system also provides facsimile (fax) and multimedia communication capabilities. The personal handy phone system has the ability to operate both indoors and outdoors, which offers greater communication opportunities. For instance, the indoor operations include using it within office spaces, homes, hotels, shopping malls, and airports. Furthermore, the outdoor operations of the personal handy phone system include using it within rural, suburban, and city areas. The personal handy phone system is well known by those skilled in the art, and is discussed in a number of publications, such as Personal Handy-Phone System (PHS) Guidebook by the Ministry of Posts & Telecommunications, Japan (1995) and Personal Handy Phone System ARIB Standard Version 2 by the Association of Radio Industries and Businesses, (1995).

Figure 1:
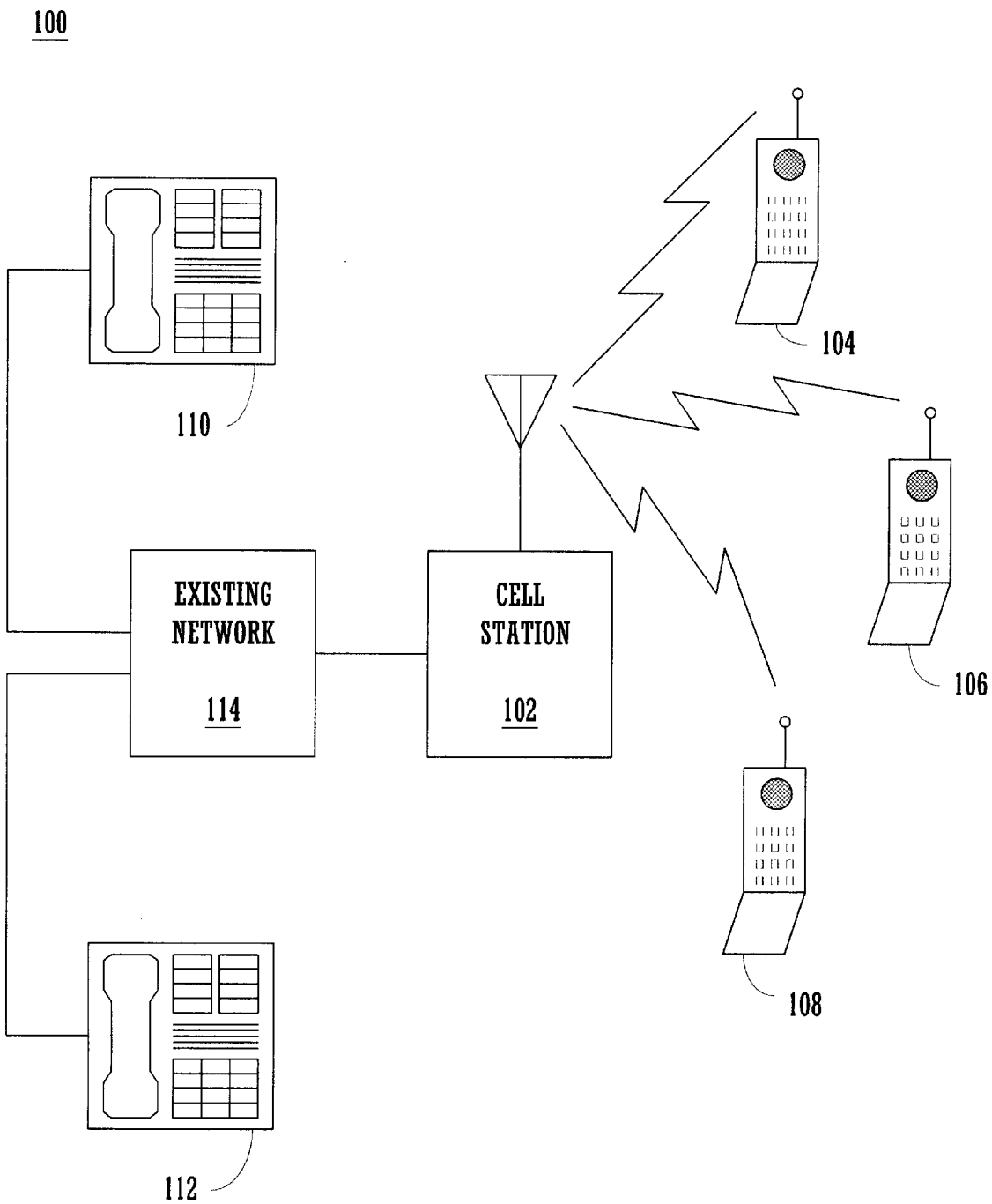
FIG. 1 is a general overview of the personal handy phone system in which the present invention operates.

FIG. 1 is a general overview of the personal handy phone system 100 in which the present invention operates. The two main components that comprise the personal handy phone system are a cell station (CS) device 102 and a personal or portable station (PS) device. Referring to FIG. 1, portable stations 104–108 are similar in function to cordless telephone handsets and have the ability to transmit and receive voice information along with other types of data. Furthermore, each one of portable stations 104–108 can be equipped with the capability to function as an answering machine by recording incoming voice/sound messages and then playing the messages back later at some desired time. Moreover, each one of portable stations 104–108 can also be equipped with the capability to record both sides of a conversation in which it is participating with another telecommunication device.

Cell station 102 of FIG. 1 is a transmitter and receiver base station which can be implemented by coupling it into an existing network 114, such as a public telephone network. Implemented in this way, cell station 102 enables the users of portable stations 104–108 to communicate with each other and with the users of telephones 110 and 112, which are coupled by wire to the existing network 114.

The information that is communicated between cell station 102 and portable stations 104–108 is the same type of information (e.g., voice/data etc.) that can normally be transmitted and received over a public telephone wire network system. Instead of communicating over a wire network, the personal handy phone system 100 uses a wireless digital radio interface to communicate information between cell station 102 and portable stations 104–108. One embodiment of the digital radio interface used by the personal handy phone system 100 is a time division multiple access capability with time division duplexing (TDMA-TDD).

Figure 2:
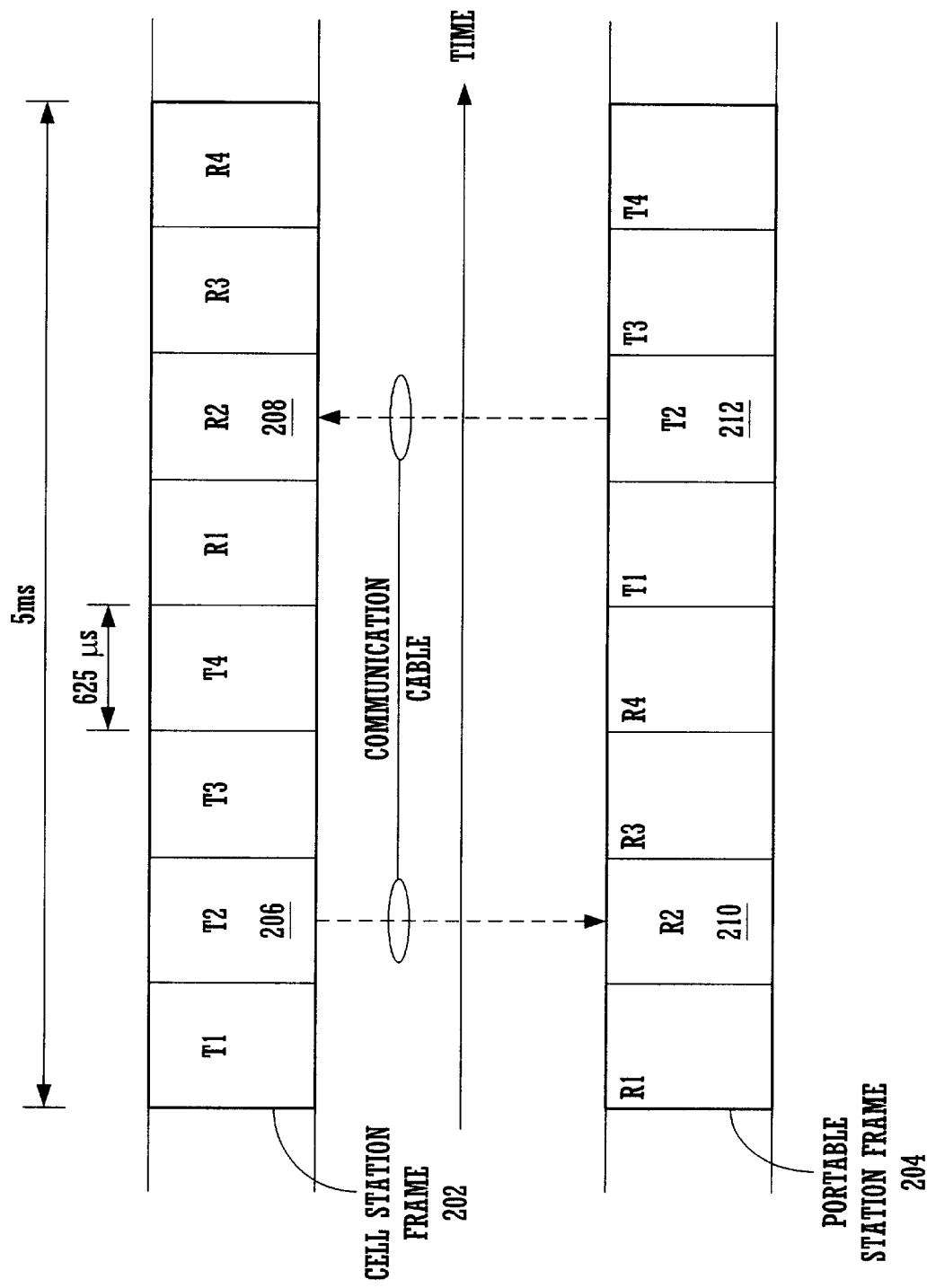
FIG. 2 illustrates one embodiment in accordance with the present invention of time division duplexed communication frames used within the personal handy phone system as a digital radio interface between cell stations and portable stations.

FIG. 2 illustrates time division duplexed frames 202 and 204, which can be used within personal handy phone system 100 of FIG. 1 as a digital radio interface between cell station 102 and multiple portable stations 104–108. Communication frames 202 and 204 each have a time interval of 5 milliseconds in one implementation, which is divided into eight communication slots, four slots are allocated for receiving data (R1, R2, R3, R4) and four slots are allocated for transmitting data (T1, T2, T3, T4). In one implementation, each communication slot within frames 202 and 204 has a time interval of 625 microseconds. Cell station 102 is able to use all the receiving slots and transmitting slots of cell station frame 202 in order to simultaneously communicate with four portable stations.

Conversely, portable station 104 only utilizes one receiving slot (e.g., slot 210) and one transmitting slot (e.g., slot 212) of portable station frame 204 while communicating with cell station 102. For example, data transmitted by cell station 102 to portable station 104 during slot 206, the second transmitting slot of frame 202, is received within corresponding slot 210, the second receiving slot of frame 204. Data transmitted by portable station 104 to cell station 102 during slot 212, the second transmitting slot of frame 204, is received within corresponding slot 208, the second receiving slot of frame 202.

In the above manner, an independent communication channel is established between portable station 104 and cell station 102 for the duration of the communication session. Therefore, cell station frame 202 allows up to four logical channels of simultaneous communication, e.g., between cell station 102 and four portable stations.

One of the techniques which is used within personal handy phone system 100 of FIG. 1 for reducing the amount of data used to represent transmitted data streams (e.g., to compress the data) is referred to as adaptive differential pulse code modulation (ADPCM). In particular, full rate (e.g., 32 kilobit-per-second) adaptive differential pulse code modulation encoding and decoding circuits are used within personal handy phone system 100 for transmitting voice information in a compressed data format between cell station 102 and portable stations 104–108. The International Telecommunication Union (ITU) has issued a recommendation, specifically G.726, concerning this type of adaptive differential pulse code modulation encoding and decoding circuits. Recommendation G.726 allows for the conversion of a 64 kilobit-per-second pulse code modulation (PCM) format channel between a 40, 32, 24 or 16 kilobit-per-second ADPCM format channel.

Figure 3:
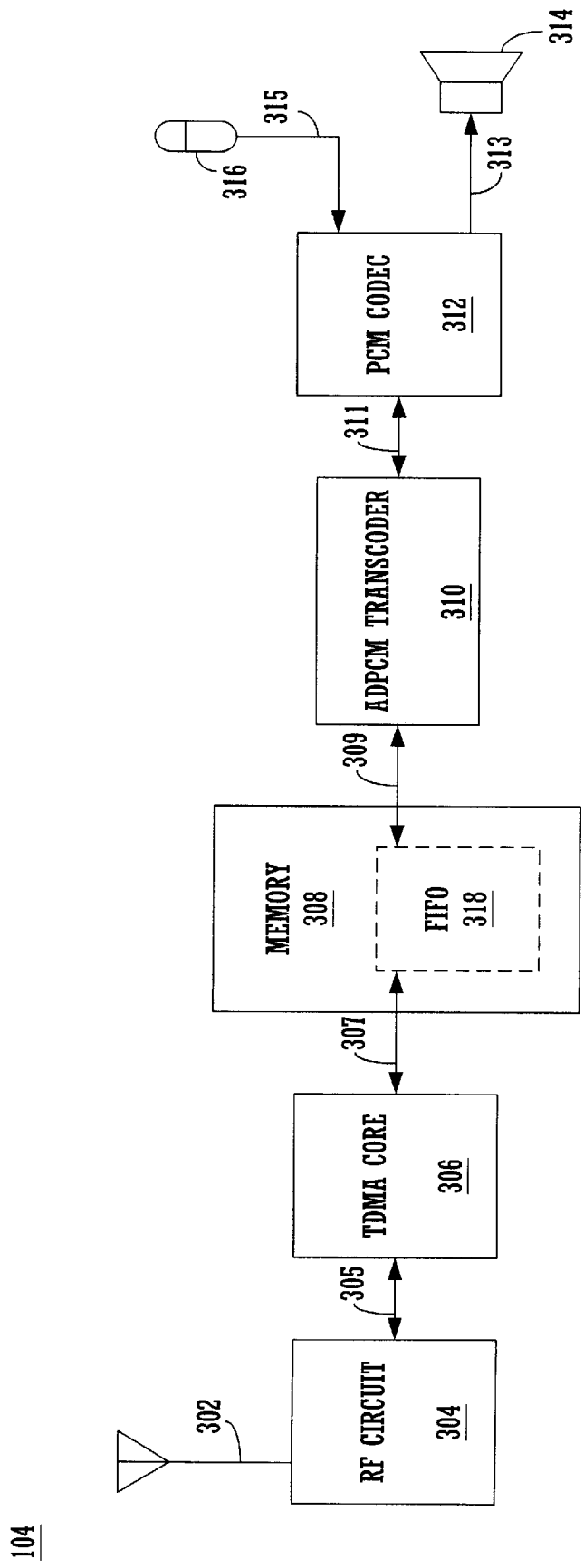
FIG. 3 is a block diagram of the electronic communication components located within a portable station in accordance with one embodiment of the present invention.

FIG. 3 is a block diagram of the electronic communication components located within portable station 104 of FIG. 1 in accordance with one embodiment of the present invention. As described above, portable station 104 of FIG. 1 can transmit and receive voice/sound communication signals in ADPCM data format. The following description of FIG. 3 explains how the electronic communication components of portable station 104 normally operate during its voice signal transmission mode and also during its voice signal reception mode. While portable station 104 operates within its normal voice signal transmission mode, microphone 316 receives any analog sound or voice signal (e.g., as produced by a user speaking) and then transmits the sound or voice signal over line 315 to a pulse code modulation (PCM) coder-decoder (CODEC) circuit 312. The PCM CODEC circuit 312 is a well known circuit which bandpass filters the received analog voice signal and then converts the bandpass filtered signal into a 14-bit linear pulse code modulation (PCM) data signal (line 311), which is output to a G.726 adaptive differential pulse code modulation (ADPCM) transcoder circuit 310. The ADPCM transcoder circuit 310 encodes the 14-bit linear pulse code modulation data signal of line 311 into a full rate (32 kilobit-per-second) 4-bit ADPCM data format signal of line 309, which is then stored within a first-in first-out (FIFO) buffer memory 318 of a computer readable memory device 308, e.g., a flash read only memory (ROM), static random access memory (SRAM), or multi-port random access memory (MPRAM). In the preferred embodiment, memory unit 308 is an MPRAM integrated circuit device.

A time division multiple access (TDMA) core circuit 306 of FIG. 3 retrieves the 4-bit ADPCM signal over line 307 from the FIFO buffer memory 318 and processes it into an output signal, which encompasses several steps. For instance, first TDMA core circuit 306 encrypts and scrambles the 4-bit ADPCM signal. Next, TDMA core 306 calculates the cyclic redundancy check (CRC) of the 4-bit ADPCM signal. The TDMA core 306 then assembles the slot data of the 4-bit ADPCM signal, e.g., adding the Unique Word, the channel identifier (CI), the cyclic redundancy check (CRC), etc. Once the TDMA core 306 has finished processing the 4-bit ADPCM signal into an output signal, it is then transferred over line 305 to a radio frequency (RF) circuit 304. The RF circuit 304 modulates the output signal into a radio frequency signal which is sent to antenna 302 to be transmitted to cell station 102 of FIG. 1 through a wireless interface.

While portable station 104 of FIG. 3 operates within its normal voice signal reception mode, antenna 302 receives a radio frequency signal transmitted by cell station 102 of FIG. 1 from the wireless interface, which is input into radio frequency (RF) circuit 304. The RF circuit 304 demodulates the received radio frequency signal and outputs a demodulated signal over line 305 to the time division multiple access (TDMA) core circuit 306. The TDMA core circuit 306 processes the demodulated signal into a full rate 4-bit adaptive differential pulse code modulation (ADPCM) signal, which encompasses several steps. For instance, first TDMA core circuit 306 detects the Unique Word of the demodulated signal and then determines its specific channel type. Next, TDMA core 306 descrambles and decrypts the demodulated signal. The TDMA core 306 then calculates the cyclic redundancy check (CRC) of the demodulated signal. Once TDMA core 306 has processed the demodulated signal of line 305 into a full rate 4-bit ADPCM signal of line 307, it is stored within FIFO buffer memory 318 of memory device 308.

The G.726 ADPCM transcoder circuit 310 of FIG. 3 retrieves the full rate 4-bit ADPCM signal over line 309 from FIFO buffer memory 318 and decodes it into a 14-bit linear pulse code modulation (PCM) data signal of line 311, which is output to the PCM CODEC circuit 312. The PCM CODEC circuit 312 converts the 14-bit linear pulse code modulation data signal of line 311 into an analog voice signal, which is low pass filtered and then output over line 313 to speaker 314 enabling a user of portable station 104 to hear the received analog voice signal.

Figure 4:
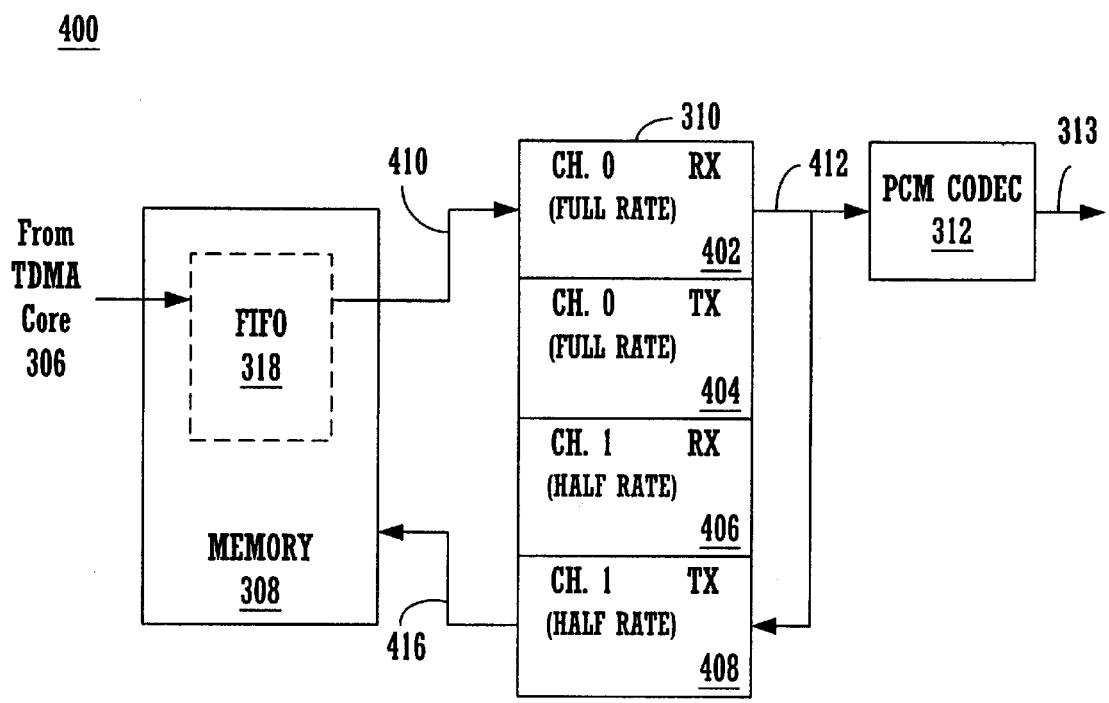
FIG. 4 is a block diagram of one embodiment of a circuit in accordance with the present invention for compressing and storing voice/sound signals while the portable station of FIG. 3 operates within an on-line voice recording mode.

FIG. 4 is a block diagram of one embodiment of a circuit 400 in accordance with the present invention for compressing and storing voice/sound signals while portable station 104 of FIG. 3 operates within an on-line voice recording mode. Portable station 104 operates in the on-line voice recording mode when functioning as an answering machine by recording incoming voice or sound signal messages. Within personal handy phone system 100, the voice/sound signals that are received by transcoder 310 of FIG. 4 are in a full rate 4-bit adaptive differential pulse code modulation (ADPCM) data format. Since a voice/sound signal in a half rate 2-bit ADPCM data format occupies less memory space when stored than the same voice/sound signal in the full rate 4-bit ADPCM data format, circuit 400 of the present invention converts the received voice/sound signals into the half rate 2-bit ADPCM data format before storing them within memory device 308. In the above manner, the memory space located within memory device 308 is effectively increased while portable station 104 operates within the on-line voice recording mode. It should be appreciated that in prior art systems the voice/sound signal in the 4-bit ADPCM data format is directly stored into memory. Direct conversion from 4 to 2-bit ADPCM data format is rather complex.

The G.726 ADPCM transcoder circuit 310 of FIG. 4 is comprised of two communication channel circuits, channel 0 (Ch. 0) and channel 1 (Ch. 1). Communication channel circuits 0 and 1 of the present invention can be implemented in different ways within the personal handy phone system. One embodiment of the present invention utilizes communication channel circuits as those described in the patent application entitled "Conference Call on a Personal Handy Phone System Portable Station," application Ser. No. 08/975,943, now U.S. Pat. No. 5,949,764 file filed on Nov. 21, 1997, by Yoshida et al., and assigned to the assignee of the present invention. Communication channel 0 of transcoder circuit 310 functions as a 32 kilobit-per-second (kbps) transcoder in which the ADPCM data word is 4-bits corresponding to the full rate (32 kbps) data rate of the International Telecommunication Union (ITU) recommendation G.726. Furthermore, communication channel 0 consists of a receiving (RX) circuit 402 and a transmitting (TX) circuit 404. In order to facilitate proper operation of RX circuit 402 and TX circuit 404, each has exclusive dedicated memory space within memory device 308. Communication channel 1 of transcoder circuit 310 functions as a 16 kilobit-per-second transcoder in which the ADPCM data word is 2-bits corresponding to the half rate (16 kbps) of the ITU recommendation G.726. Furthermore, communication channel 1 consists of a receiving (RX) circuit 406 and a transmitting (TX) circuit 408. In order to facilitate proper operation of RX circuit 406 and TX circuit 408, each has exclusive dedicated memory space within memory device 308.

When portable station 104 of FIG. 3 is functioning as an answering machine in the on-line voice recording mode in accordance within the present invention, any incoming voice/sound signal is received, processed, and stored within FIFO buffer memory 318 of memory device 308 as previously described with reference to FIG. 3. The Ch. 0 RX circuit 402 of transcoder circuit 310 is coupled to retrieve a full rate (32 kbps) 4-bit ADPCM data signal over line 410 from FIFO buffer memory device 318. The Ch. 0 RX circuit 402 decodes the received 4-bit ADPCM data signal on line 410 into a 14-bit linear pulse code modulation (PCM) data signal on line 412 which is fed to the Ch. 1 TX circuit 408 and PCM CODEC circuit 312. The output of the Ch. 0 RX circuit 402 is connected in a "loop back" fashion to the input of the Ch. 1 TX circuit 408. The Ch. 1 TX circuit 408 then encodes the received 14-bit linear PCM data signal of line 412 into a half rate (16 kbps) 2-bit ADPCM data signal on line 416, which a micro-controller (not shown) reads and subsequently stores within memory device 308. In this fashion, a received full rate 4-bit ADPCM data format voice/sound signal of line 410 is recorded within memory 308 as a half rate 2-bit ADPCM data signal of line 416.

Since the 2-bit ADPCM data signal of line 416 occupies less memory space when stored, it effectively increases the usage of the limited memory resources within memory 308. It should be appreciated that there are not any digital signal processor (DSP) integrated circuit chips used within circuit 400, thereby reducing the cost of the overall system.

Referring to FIG. 4, it should be appreciated that Ch. 0 RX circuit 402 optionally outputs the 14-bit linear PCM data signal of line 412 to the PCM CODEC circuit 312 to enable a user of portable station 104 of FIG. 3 to listen to the voice message currently being recorded by it. For instance, when the 14-bit linear PCM data signal of line 412 is received by the PCM CODEC circuit 312, it is converted into an analog signal and then low pass filtered. The PCM CODEC circuit 312 then outputs an analog voice signal on line 313 to speaker 314 of FIG. 3, enabling a user to hear the voice message that is being recorded by portable station 104. Therefore, the reception of the 14-bit linear PCM data signal over line 412 by the PCM CODEC circuit 312 is optional to the operation of circuit 400 within the present invention.

Figure 5:
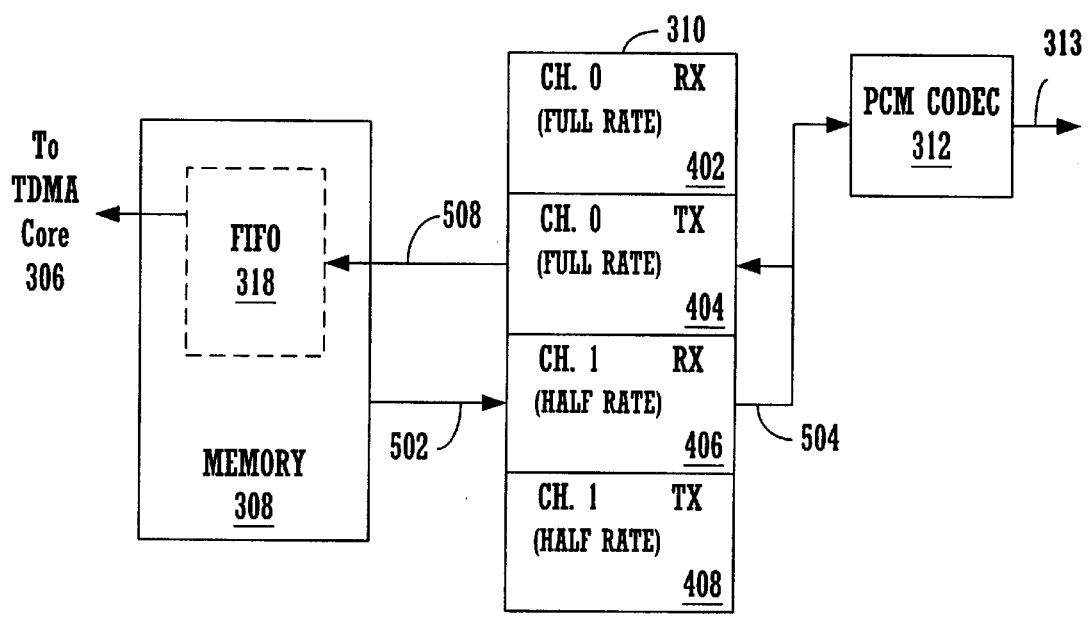
FIG. 5 is a block diagram of one embodiment of a circuit in accordance with the present invention for decompressing previously compressed and stored voice/sound signals while the portable station of FIG. 3 operates within an online line voice playback mode.

FIG. 5 is a block diagram of one embodiment of a circuit 500 in accordance with the present invention for decompressing previously compressed and stored voice/sound signals while portable station 104 of FIG. 3 operates within an on-line voice playback mode. Portable station 104 operates in the on-line voice playback mode when a remotely located user calls it (e.g., using a public telephone) in order to playback and listen to voice/sound messages, if any were previously stored within memory device 308. Within one embodiment of the present invention, the voice/sound signals stored within memory device 308 are in the half rate 2-bit ADPCM data format. Since the components located within portable station 104 and cell station 102 of FIG. 1 are functionally organized to handle voice/sound signals in the full rate 4-bit ADPCM data format, circuit 500 of the present invention converts the voice/sound signals retrieved from memory 308 into the full rate 4-bit ADPCM data format before playback. In this manner, the previously stored voice/sound signals within memory 308 are decompressed while portable station 104 operates in the on-line voice playback mode.

In order for portable station 104 of FIG. 3 to operate in the on-line playback mode, a half rate (16 kbps) 2-bit ADPCM data format voice/sound signal is previously stored within memory device 308 of FIG. 5. A micro-processor (not shown) reads and transmits the 2-bit ADPCM data format voice/sound signal on line 502 to communication channel 1 (Ch. 1) receiving (RX) circuit 406 of the ADPCM transcoder circuit 310. The Ch. 1 RX circuit 406 decodes the received 2-bit ADPCM data format voice/sound signal of line 502 into a 14-bit linear pulse code modulation (PCM) data signal on line 504. The output of Ch. 1 RX circuit 406 is connected in a "loop back" fashion to the input of the communication channel 0 (Ch. 0) transmitter (TX) circuit 404. The Ch. 0 TX circuit 404 encodes the received 14-bit linear PCM data signal of line 504 into a full rate (32 kbps) 4-bit ADPCM data signal on line 508, which is fed to FIFO buffer memory 318 of memory device 308. Subsequently the 4-bit ADPCM data signal of line 508 is processed and transmitted by portable station 104 to ultimately reach the user at some remote location. In this fashion, a half rate 2-bit ADPCM data format voice/sound signal of line 502 stored within memory 308 is decompressed into a full rate 4-bit ADPCM data signal of line 508 for eventual playback to a user in a remote location.

Referring to FIG. 5, it should be appreciated that while portable station 104 of FIG. 3 is operating in the on-line voice playback mode, PCM CODEC circuit 312 can optionally receive the 14-bit linear PCM data signal of line 504 that is output by Ch. 1 RX circuit 406. Whether the 14-bit linear PCM data signal of line 504 is sent to PCM CODEC circuit 312 is software selectable. When the 14-bit linear PCM data signal of line 504 is received by PCM CODEC circuit 312, it is converted into an analog signal and then low pass filtered. The PCM CODEC circuit 312 then outputs an analog voice signal over line 313 to speaker 314 of FIG. 3 enabling someone to hear the stored voice message. It should be noted that when portable station 104 operates within the on-line voice playback mode, the contemplated user is remotely listening to the voice messages stored within portable station 104. Therefore, it is unnecessary to output the 14-bit linear PCM data signal of line 504 to the PCM CODEC circuit 312 since the intended listener is not in the vicinity of portable station 104 to hear the voice messages output from speaker 314.

Figure 6:
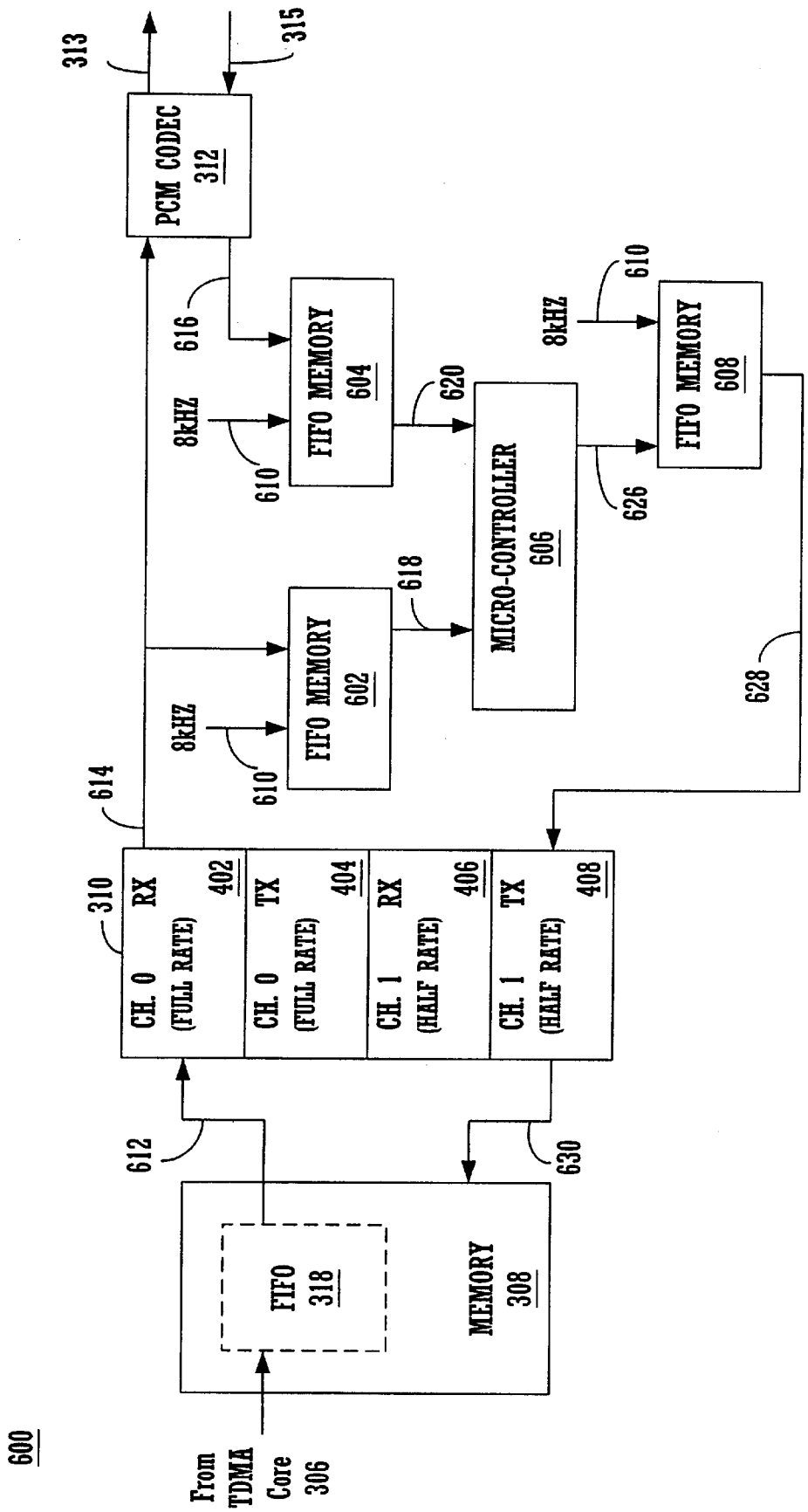
FIG. 6 is a block diagram of one embodiment of a circuit in accordance with the present invention for compressing and storing voice/sound signals while the portable station of FIG. 3 operates within an on-line conversation recording mode.

FIG. 6 is a block diagram of one embodiment of a circuit 600 in accordance with the present invention for compressing and storing voice/sound signals while portable station 104 of FIG. 3 operates within an on-line conversation recording mode. While portable station 104 is being utilized to communicate with another telecommunication device (e.g., telephone 110 of FIG. 1), it can operate within the on-line conversation recording mode by recording the voice/sound signals of the conversation. As part of the process of recording the voice/sound signals of a conversation, circuit 600 of the present invention receives the separate voice (sound) signals of a conversation and mixes them, resulting in a conversation signal. Since a conversation signal in a half rate 2-bit ADPCM data format occupies less memory space when stored than the same conversation signal in the full rate 4-bit ADPCM data format, circuit 600 of the present invention converts the conversation signal into the half rate 2-bit ADPCM data format before storing it within memory 308. In this manner, the limited memory space located within memory device 308 is effectively increased while portable station 104 operates within the on-line conversation recording mode.

When portable station 104 of FIG. 3 functions within the on-line conversation recording mode in accordance within the present invention, any incoming voice/sound signal is received, processed, and stored within FIFO buffer memory 318 of memory device 308 as previously described with reference to FIG. 3. The communication channel 0 (Ch. 0) receiving (RX) circuit 402 of the G.726 ADPCM transcoder circuit 310 is coupled to retrieve a full rate (32 kbps) 4-bit ADPCM data signal of line 612 from FIFO buffer memory 318. The Ch. 0 RX circuit 402 decodes the received 4-bit ADPCM data signal of line 612 into a 14-bit linear pulse code modulation (PCM) data signal on line 614 which is output to a FIFO memory device 602 and PCM CODEC circuit 312. The PCM CODEC circuit 312 converts the 14-bit linear PCM data signal of line 614 into an analog voice signal on line 313 which is output to speaker 314 of FIG. 3 enabling a user to hear the received voice signal of the conversation.

The 14-bit linear PCM data signal of line 614 of FIG. 6 is also sampled by an 8 kilohertz (kHz) strobe signal 610 before being stored within FIFO memory device 602. One embodiment of FIFO memory device 602 in accordance with the present invention is a 14-bit by 2 FIFO memory device. Another embodiment of FIFO memory device 602 in accordance with the present invention is a buffer device.

During an on-line conversation, when an analog voice/sound signal is produced by a user of portable station 104 of FIG. 3, it is received by microphone 316 and input into PCM CODEC circuit 312 via line 315 of FIG. 6. The PCM CODEC circuit 312 converts the received analog voice/sound signal of line 315 into a 14-bit linear PCM data signal on line 616 which is output to FIFO memory 604. The 14-bit linear PCM data signal of line 616 is sampled by an 8 kHz strobe signal 610 before being stored within FIFO memory device 604. One embodiment of FIFO memory device 604 in accordance with the present invention is a 14-bit by 2 FIFO memory device. Another embodiment of FIFO memory device 604 in accordance with the present invention is a buffer device.

Micro-controller 606 of FIG. 6 retrieves the 14-bit linear PCM data signal of line 614 stored within FIFO memory device 602 over line 618 and divides its dynamic range value in half. Concurrently, micro-controller 606 also retrieves the 14-bit linear PCM data signal of line 616 stored within FIFO memory device 604 over line 620 and divides its dynamic range value in half. Micro-controller 606 independently divides in half the dynamic range values of the 14-bit linear PCM data signals of lines 618 and 620 to avoid saturation when these two signals are subsequently added together.

Micro-controller 606 then combines or mixes the 14-bit linear PCM data signals of lines 618 and 620 together resulting in a 14-bit linear PCM data format conversation signal on line 626 which is fed to FIFO memory device 608. The 14-bit linear PCM data format conversion signal of line 626 is sampled by the 8 kHz strobe signal 610 before being stored within FIFO memory device 608. One embodiment of FIFO memory device 608 in accordance with the present invention is a 14-bit by 2 FIFO memory device. Another embodiment of FIFO memory device 608 in accordance with the present invention is a buffer device.

The 14-bit linear PCM data format conversion signal of line 626 of FIG. 6 stored within FIFO memory device 608 is read by hardware and sent over line 628 to the communication channel 1 (Ch. 1) transmitting (TX) circuit 408. The Ch. 1 TX circuit 408 encodes the received 14-bit linear PCM data format conversation signal of line 628 into a half rate (16 kbps) 2-bit ADPCM data signal on line 630, which a micro-controller (not shown) reads and subsequently stores within memory device 308. In this fashion, two voice signals of a conversion are effectively mixed and then recorded within memory 308 as a half rate 2-bit ADPCM data signal of line 630. Since a conversation signal in the half rate 2-bit ADPCM data format occupies less memory space when stored than the same conversation signal in the full rate 4-bit ADPCM data format, circuit 600 of the present invention effectively increases the usage of the limited memory resources within memory 308.

Figure 7:
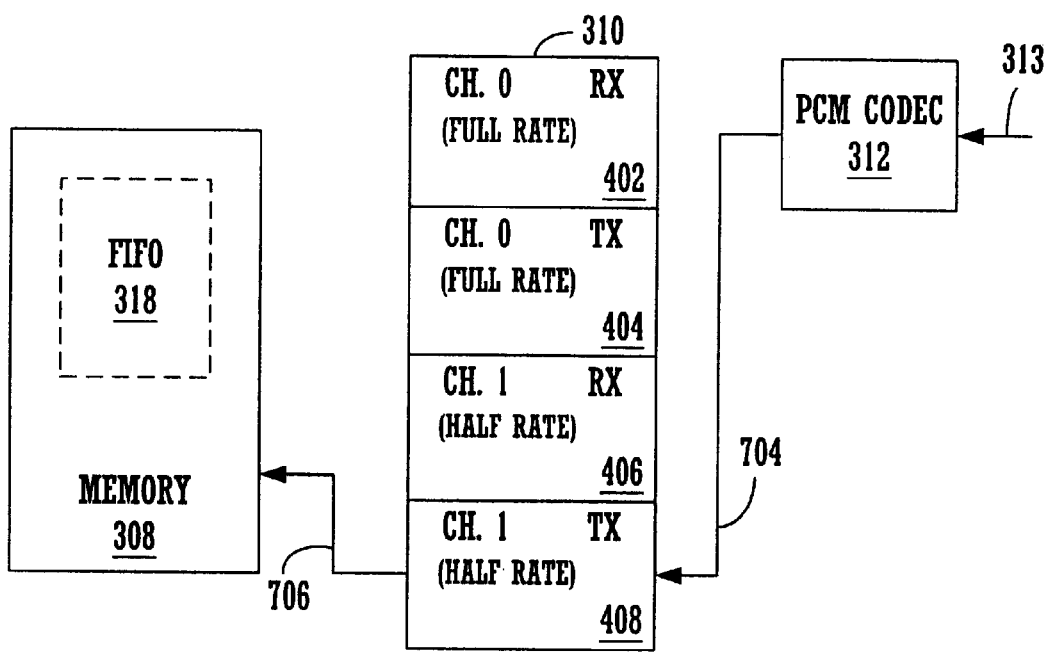
FIG. 7 is a block diagram of one embodiment of a circuit in accordance with the present invention for compressing and storing voice/sound signals while the portable station of FIG. 3 operates within an off-line voice recording mode.

FIG. 7 is a block diagram of one embodiment of a circuit 700 in accordance with the present invention for compressing and storing voice/sound signals while portable station 104 of FIG. 3 operates within an off-line voice recording mode. Portable station 104 operates in the off-line voice recording mode while recording voice/sound signals that are subsequently used as an "outgoing message" when functioning as an answering machine. Since a voice/sound signal in the half rate 2-bit ADPCM data format occupies less memory space when stored than the same voice/sound signal in the full rate 4-bit ADPCM data format, circuit 700 of the present invention converts the received voice/sound signals to the half rate 2-bit ADPCM data format before storing them within memory 308. In this manner, the memory space located within memory device 308 is effectively increased while portable station 104 operates within the off-line voice recording mode.

During off-line voice recording mode in accordance with the present invention, the user produces an analog voice/sound signal which is received by microphone 316 of FIG. 3 and input into PCM CODEC circuit 312 via line 315 of FIG. 7. The PCM CODEC circuit 312 bandpass filters analog voice/sound signal of line 315 and then converts it into a 14-bit linear PCM data signal on line 704 which is fed to the communication channel 1 (Ch. 1) transmitting (TX) circuit 408 of the G.726 ADPCM transcoder circuit 310. The Ch. 1 TX circuit 408 encodes the received 14-bit linear PCM data signal of line 704 into a half rate (16 kbps) 2-bit ADPCM data signal on line 706, which a micro-controller (not shown) reads and subsequently stores within memory device 308. In this fashion, an "outgoing message" voice signal is compressed and stored within memory device 308 in order to effectively increase its limited memory space.

Figure 8:
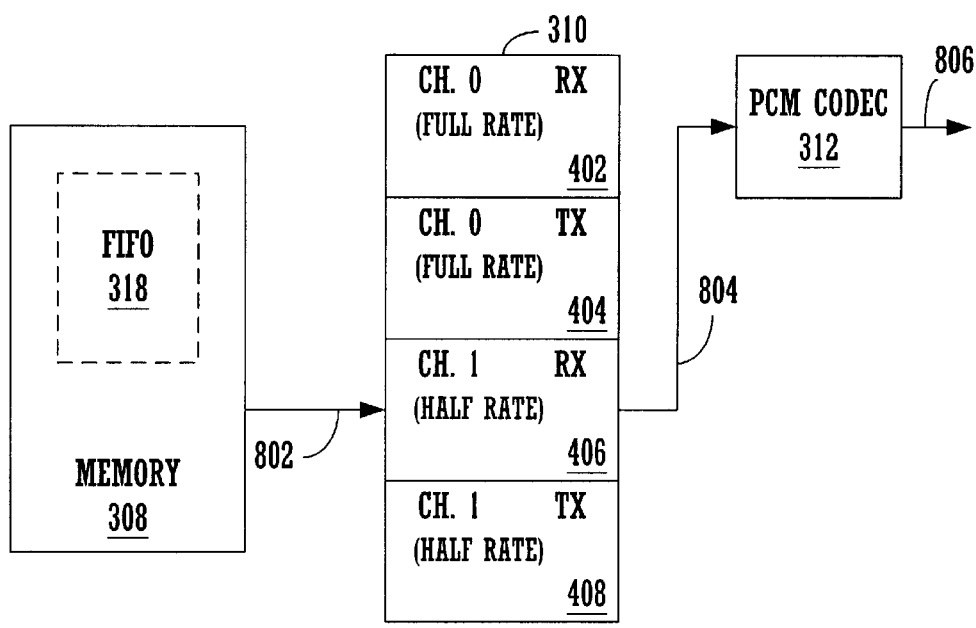
FIG. 8 is a block diagram of one embodiment of a circuit in accordance with the present invention for decompressing previously compressed and stored voice/sound signals while the portable station of FIG. 3 operates within an off-line voice playback mode.

FIG. 8 is a block diagram of one embodiment of a circuit 800 in accordance with the present invention for decompressing previously compressed and stored voice/sound signals while portable station 104 of FIG. 3 operates within an off-line voice playback mode. Portable station 104 operates in the off-line voice playback mode by playing back voice messages previously stored within memory device 308, enabling a user within the vicinity of speaker 314 to hear them. Within one embodiment of the present invention, the voice/sound signals stored within the memory device 308 are in the half rate 2-bit ADPCM data format in order to increase the memory space of memory device 308. Circuit 800 of the present invention decompresses the voice/sound signals stored within memory device 308 and then converts them into analog voice/sound signals.

In order for portable station 104 of FIG. 3 to operate in the off-line voice playback mode, a half rate (16 kbps) 2-bit ADPCM data format voice/sound signal is previously stored within memory device 308 of FIG. 8. A micro-processor (not shown) reads and transmits the 2-bit ADPCM data format voice/sound signal on line 802 to communication channel 1 (Ch. 1) receiving (RX) circuit 406 of the ADPCM transcoder circuit 310. The Ch. 1 RX circuit 406 decodes the received 2-bit ADPCM data format voice signal of line 802 into a 14-bit linear pulse code modulation (PCM) data signal on line 804 which is fed to PCM CODEC circuit 312. The PCM CODEC circuit 312 converts the 14-bit linear PCM data signal of line 804 into an analog signal, which it then low pass filters. The PCM CODEC circuit 312 outputs an analog voice signal on line 313 to speaker 314 of FIG. 3, enabling a user to listen to the stored voice/sound messages. In this fashion, a half rate 2-bit ADPCM data format voice/sound signal of line 802 stored within memory 308 is decompressed for eventual playback to a user in the vicinity of speaker 314.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit for encoding and decoding voice signals within a portable station of a personal handy phone system, said circuit comprising:
    a first receiving channel circuit coupled to receive a first voice signal over a wireless interface and for decoding said first voice signal from a first data format to a second data format;
    a converter circuit coupled to receive said first voice signal in said second data format and for converting said first voice signal from said second data format to an analog data format, said converter circuit also coupled to receive a second voice signal in said analog data format and for converting said second voice signal from said analog data format to said second data format;
    a first buffer device for storing said first voice signal in said second data format;
    a second buffer device for storing said second voice signal in said second data format;
    a controller circuit coupled to said first and second buffer devices and for mixing said first and second voice signals to produce a conversation signal in said second data format;
    a third buffer device for storing said conversation signal;
    a first transmitting channel circuit coupled to said third buffer device to receive said conversation signal and for encoding said conversation signal from said second data format to a third data format, said third data format being a compression of said first data format; and
    a memory device coupled to said first transmitting channel circuit to receive said conversation signal and for storing said conversation signal in said third data format.

2. The circuit as described in claim 1 further comprising:
    a speaker coupled to said converter circuit to receive said first voice signal in said analog data format and for rendering audible said first voice signal; and
    a microphone coupled to said converter circuit and coupled to receive said second signal in said analog data format and for sending said second signal in said analog data format to said converter circuit.

3. The circuit as described in claim 1 wherein:
    said first buffer device is a first-in first-out (FIFO) memory device;
    said second buffer device is a first-in first-out (FIFO) memory device; and
    said third buffer device is a first-in first-out (FIFO) memory device.

4. The circuit as described in claim 1 wherein:
    said first receiving channel circuit is adapted to receive a third voice signal received by said portable station from said wireless interface and for decoding said third voice signal from said first data format to said second data format;
    said first transmitting channel circuit is coupled to said first receiving channel circuit to receive said third voice signal in said second data format and for encoding said third voice signal from said second data format to said third data format; and
    said memory device is coupled to said first transmitting channel circuit to receive said third voice signal in said third data format and is for storing said third voice signal in said third data format.

5. The circuit as described in claim 4 further comprising:
    a second receiving channel circuit coupled to said memory device to receive a stored voice signal in said third data format and for decoding said stored voice signal from said third data format to said second data format; and
    a second transmitting channel circuit coupled to said second receiving channel circuit to receive said stored voice signal in said second data format and for encoding said stored voice signal from said second data format to said first data format, wherein said stored voice signal in said first data format is for transmission over said wireless interface.

6. The circuit as described in claim 1 wherein said first data format is a full rate adaptive differential pulse code modulation (ADPCM) data signal.

7. The circuit as described in claim 6 wherein said second data format is a pulse code modulation (PCM) data signal.

8. The circuit as described in claim 7 wherein said third data format is a half rate adaptive differential pulse code modulation (ADPCM) data signal.

9. The circuit as described in claim 8 wherein:
    said full rate adaptive differential pulse code modulation (ADPCM) data signal is 4-bits substantially complying with International Telecommunication Union (ITU) recommendation G.726 for 32 kilobits-per-second data rate;

said half rate adaptive differential pulse code modulation (ADPCM) data signal is 2-bits substantially complying with International Telecommunication Union (ITU) recommendation G.726 for 16 kilobits-per-second data rate; and said pulse code modulation (PCM) data signal is a 14-bit linear pulse code modulation signal.

10. An apparatus for encoding and decoding voice signals within a portable station of a personal handy phone system, said apparatus comprising:

a first receiving channel means coupled to receive a first voice signal over a wireless interface and for decoding said first voice signal from a first data format to a second data format;

a converter means coupled to receive said first voice signal in said second data format and for converting said first voice signal from said second data format to an analog data format, said converter means also coupled to receive a second voice signal in said analog data format and for converting said second voice signal from said analog data format to said second data format;

a first buffer means for storing said first voice signal in said second data format;

a second buffer means for storing said second voice signal in said second data format;

a controller means coupled to said first and second buffer means and for mixing said first and second voice signals to produce a conversation signal in said second data format;

a third buffer means for storing said conversation signal;

a first transmitting channel means coupled to said third buffer means to receive said conversation signal and for encoding said conversation signal from said second data format to a third data format, said third data format being a compression of said first data format; and a memory means coupled to said first transmitting channel means to receive said conversation signal and for storing said conversation signal in said third data format.

11. The apparatus as described in claim 10 further comprising:

a speaker coupled to said converter means to receive said first voice signal in said a nalog data format and for rendering audible said first voice signal; and a microphone coupled to said converter means and coupled to receive said second signal in said analog data format and for sending said second signal in said analog data format to said converter means.

12. The apparatus as described in claim 10 wherein:

said first buffer means is a first-in first-out (FIFO) memory device;

said second buffer means is a first-in first-out (FIFO) memory device; and said third buffer means is a first-in first-out (FIFO) memory device.

13. The apparatus as described in claim 10 wherein:

said first receiving channel means for receiving a third voice signal received by said portable station from said wireless interface and for decoding said third voice signal from said first data format to said second data format;

said first transmitting channel means is coupled to said first receiving channel means to receive said third voice signal in said second data format and for encoding said third voice signal from said second data format to said third data format; and said memory means is coupled to said first transmitting channel means to receive said third voice signal in said third data format and is for storing said third voice signal in said third data format.

14. The apparatus as described in claim 13 further comprising:

a second receiving channel means coupled to said memory means to receive a stored voice signal in said third data format and for decoding said stored voice signal from said third data format to said second data format; and a second transmitting channel means coupled to said second receiving channel means to receive said stored voice signal in said second data format and for encoding said stored voice signal from said second data format to said first data format, wherein said stored voice signal in said first data format is for transmission over said wireless interface.

15. The apparatus as described in claim 10 wherein said first data format is a full rate adaptive differential pulse code modulation (ADPCM) data signal.

16. The apparatus as described in claim 15 wherein said second data format is a pulse code modulation (PCM) data signal.

17. The apparatus as described in claim 16 wherein said third data format is a half rate adaptive differential pulse code modulation (ADPCM) data signal.

18. The apparatus as described in claim 17 wherein:

said full rate adaptive differential pulse code modulation (ADPCM) data signal is 4-bits substantially complying with International Telecommunication Union (ITU) recommendation G.726 for 32 kilobits-per-second data rate;

said half rate adaptive differential pulse code modulation (ADPCM) data signal is 2-bits substantially complying with International Telecommunication Union (ITU) recommendation G.726 for 16 kilobits-per-second data rate; and said pulse code modulation (PCM) data signal is a 14-bit linear pulse code modulation signal.

* * * * *